US010785286B2

(12) United States Patent
Gu et al.

(10) Patent No.: US 10,785,286 B2
(45) Date of Patent: Sep. 22, 2020

(54) PROACTIVE CONTENT PUSH FOR ENHANCING REAL-TIME SERVICE DELIVERY VIA CLOUD

(71) Applicant: International Business Machines Corporation, Armonk, NY (US)

(72) Inventors: Yu Gu, Austin, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 15/147,747

(22) Filed: May 5, 2016

(65) Prior Publication Data
US 2017/0324807 A1    Nov. 9, 2017

(51) Int. Cl.
*H04L 29/08* (2006.01)
*H04W 4/18* (2009.01)

(52) U.S. Cl.
CPC .............. *H04L 67/10* (2013.01); *H04L 67/02* (2013.01); *H04W 4/18* (2013.01); *H04L 67/22* (2013.01)

(58) Field of Classification Search
USPC ........................................................ 709/219
See application file for complete search history.

(56) References Cited

U.S. PATENT DOCUMENTS

| 8,036,877 | B2 | 10/2011 | Treadgold et al. |
| 8,977,681 | B2 | 3/2015 | Zhu et al. |
| 9,231,949 | B1 | 1/2016 | Jenkins et al. |
| 2008/0139112 | A1 | 6/2008 | Sampath et al. |
| 2009/0112975 | A1* | 4/2009 | Beckman ................ H04L 67/26 709/203 |
| 2012/0066393 | A1 | 3/2012 | Tekwani |
| 2012/0246257 | A1 | 9/2012 | Brown |

(Continued)

FOREIGN PATENT DOCUMENTS

| CN | 103973737 A | 8/2014 |
| EP | 2460136 A2 | 6/2012 |

OTHER PUBLICATIONS

Soni et al., "Referer' based Predictive Caching and Session Prefetching for Browser," 2014 Annual IEEE India Conference (INDICON), pp. 1-6, 2014.

(Continued)

*Primary Examiner* — Tonia L Dollinger
*Assistant Examiner* — Joseph M Cousins
(74) *Attorney, Agent, or Firm* — Patterson + Sheridan, LLP (57) ABSTRACT

Embodiments disclose systems, methods, and computer program products to perform an operation for proactively sending content to mobile devices. The operation generally includes receiving, from an application executing on a mobile device, a request to access content, and identifying, from a plurality of content items, at least a first content item responsive to the request. The operation also includes determining at least a second one of the content items based at least in part on the request, a context of the mobile device and feedback regarding at least one of the content items sent to the mobile device. The operation further includes generating a response to the request that includes at least the first content item and the second content item, and sending the response to the application.

13 Claims, 6 Drawing Sheets

(56) References Cited

U.S. PATENT DOCUMENTS

| | | | |
|---|---|---|---|
| 2014/0359491 A1* | 12/2014 | Teeraparpwong | G06F 16/954 715/760 |
| 2014/0379840 A1* | 12/2014 | Dao | H04L 67/2847 709/213 |
| 2015/0074551 A1* | 3/2015 | O'Sullivan | H04L 65/403 715/753 |
| 2015/0161284 A1 | 6/2015 | Mineki et al. | |
| 2015/0229731 A1 | 8/2015 | Mazahir | |
| 2015/0334041 A1 | 11/2015 | Hedbor et al. | |
| 2016/0164998 A1* | 6/2016 | Saxena | G06F 17/30902 709/213 |
| 2016/0212069 A1* | 7/2016 | Cohen | H04L 49/90 |
| 2016/0248867 A1* | 8/2016 | Alstad | H04L 67/26 |
| 2016/0292579 A1* | 10/2016 | Parikh | G06N 5/045 |
| 2017/0085602 A1* | 3/2017 | Wei | H04L 65/1089 |

OTHER PUBLICATIONS

Han et al., "MetaPush: Cellular-Friendly Server Push for HTTP/2," Proceedings of the 5th Workshop on All Things Cellular: Operations, Applications and Challenges, pp. 57-62, ACM, 2015.

Khalid et al., "Improving the Performance of SPDY for Mobile Devices," HotMobile (Poster Session), 2015, 1 page.

Armstrong et al., "Just-In-Time Push Prefetching: Accelerating the Mobile Web," 2013 IEEE 27th International Conference on Advanced Information Networking and Applications (AINA), pp. 1064-1071, 2013.

Adya et. al., "Thialfi: A Client Notification Service for Internet-Scale Applications," Proc. 23rd ACM Symposium on Operating Systems Principles (SOSP) (2011), pp. 129-142.

\* cited by examiner

PROACTIVE CONTENT PUSH FOR ENHANCING REAL-TIME SERVICE DELIVERY VIA CLOUD

BACKGROUND

The present disclosure generally relates to cloud computing, and more specifically, to techniques for proactively pushing content to computing devices via the cloud.

Cloud computing services are increasingly being used by software developers to manage and develop complex applications. Mobile Backend as a Service (MBaaS), for example, is one type of cloud computing platform that developers can use to link complex applications with various cloud-based back ends while providing complex services to the applications. Generally, MBaaS is a bridge between the front-end of an application executing on a computing device (e.g., mobile device) and the various cloud-based back ends. Example cloud-based back-ends include data storage services, user management services, messaging services, push notification services, social media services, analytics services, location services, and the like. MBaaS can provide these services via a set of unified application programming interfaces (APIs) and software development kits (SDKs), providing a consistent way to manage back-end data. A mobile application can leverage MBaaS to, for example, load search results, store or retrieve images, publish content to social media, etc.

Communication between mobile devices and MBaaS follows a client-server (request-response) model. Such communication, however, is generally passive and indirect. For example, in a typical data exchange, an MBaaS server may send a notification (e.g., push notification) that content is available for the mobile device. Once the notification is received, the mobile device can request the content from the MBaaS server. In response, the MBaaS server can deliver the content to the mobile device. Sending content in such a passive manner, however, can degrade the overall user experience on the mobile device.

SUMMARY

One embodiment presented herein describes a method for proactively sending content to mobile devices. The method generally includes receiving, from an application executing on a mobile device, a request to access content. The method also includes identifying, from a plurality of content items, at least a first content item responsive to the request. The method further includes determining, at least a second one of the content items based at least in part on the request, a context of the mobile device and feedback regarding at least one of the content items sent to the mobile device. The method further yet includes generating a response to the request that includes at least the first content item and the second content item, and sending the response to the mobile device.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein provide techniques for proactively delivering content to mobile devices to improve the experience of mobile device users. More specifically, embodiments presented herein provide techniques for sending additional content (e.g., in addition to content requested by a mobile device) to mobile devices based on information from the mobile device that sent the request and/or information from other mobile devices.

For example, users may use a mobile application to request content from an MBaaS server. In one example, a user may use a mobile application (e.g., an image/video sharing application) to view and share images/videos stored in the cloud. The mobile application can send a corresponding search request for the content to the MBaaS server. Typically, with conventional communication protocols, the MBaaS server responds to the search request with the requested content and waits for another search request for additional content before sending the additional content to the mobile device. For example, the MBaaS server may use a version of Hypertext Transfer Protocol (HTTP) (e.g., such as HTTP/1.1 and earlier versions) that may not allow servers to send additional content (e.g., in addition to requested content) to the mobile device using the same transmission control protocol (TCP) connection that was used to send the initial request.

As described in detail below, once a request for content is received from a particular mobile device, an MBaaS server may determine additional content that are likely to be requested by the mobile device. As an example, when a user uses a mobile application to request images from the MBaaS server, the mobile application may send requests for each individual image (i.e., requesting pictures one by one), for example, starting from images viewable from a current view on the user's mobile device. In one embodiment, instead of passively waiting for the next image request, the MBaaS server can determine additional images that the mobile application is likely to request from a database in the cloud based, in part, on a context of the mobile device. For example, the context of the mobile device may include applications currently executing on the mobile device, the resource use of the mobile device, the nature of the request issued by the mobile device, a current view on the mobile device, location of the mobile device, and the like. In the above example, the MBaaS server may determine, from the request and context of the mobile device, that the application is requesting images from a particular album (or location, or from a particular date or other attribute), and identify multiple images (with the same attribute as the requested image) that are likely to be shown either before or after an image currently displayed on a display of the mobile device.

Once additional content is identified, the MBaaS server can push the additional content along with the content that was specifically requested to the mobile device (e.g., in advance of the user requesting the additional content). For example, the MBaaS server can use a version of HTTP (e.g., HTTP/2) to send content in addition to requested content to the mobile device. For a single request from a mobile device, the HTTP/2 protocol allows a server to reuse the TCP connection in order to send the additional content, as opposed to just sending the content that was requested. In this manner, once additional content is identified, the MBaaS server can reduce the delay associated with delivering additional content to the mobile device.

In some cases, the MBaaS server can evaluate feedback from the mobile device regarding the additional content pushed to the mobile device. For example, once additional content is pushed to the mobile device, the mobile device can provide feedback regarding whether the additional pushed content was accurate. Referring to an example of a mobile application that is used to search for nearby restaurants, in response to a request for nearby restaurants that serve hotdogs, the MBaaS server may return a list of restaurants near the user's location that specialize in hotdogs and also a list of restaurants near the user's location that serve other food (e.g., hamburgers, tacos, etc.). If the user subsequently uses the application to search for one of the other restaurants, the application can use the additional content that was proactively pushed to the mobile device, rather than sending another request for that additional content. On the other hand, in some cases, the user may not use the mobile application to request the additional pushed content (e.g., the user may have requested other content). In this manner, the mobile device can monitor the usage of pushed content (by different applications) and can provide feedback regarding whether the additional content was used by applications to the MBaaS server.

Alternatively or additionally, in some cases, the MBaaS server can evaluate information from other mobile devices (e.g., such as contexts from the other mobile devices), in addition to the context of the mobile device that sent a request, to determine what additional content to push to a given mobile device. For example, the MBaaS server can consider a local context (e.g., generated from the user's mobile device sending a current request) and/or a global context (e.g., generated from one or more other users' mobile devices). In some cases, the other mobile devices may be similar to the mobile device sending the current request. For example, such mobile devices may be in the same location as the mobile device sending the request, have same or similar resource configuration as the mobile device sending the request, executing one or more applications that are the same or similar to applications currently executing on the mobile device sending the request, etc. Referring again to the above example, the MBaaS can determine what additional restaurants to push to the mobile device, based on the location of the mobile device (determined from the context of the mobile device), and the types of restaurants that have been requested by other users in the same or nearby location as the mobile device. In this manner, the MBaaS server can use collective information from other mobile devices as well as feedback provided by the mobile device sending a request to improve the usefulness of additional content pushed to the mobile device, thereby enhancing the user's experience.

Note embodiments of the disclosure are described herein using interactions between mobile devices and a computing cloud platform as a reference example of a type of deployment scenario in which the techniques for proactively pushing content can be used (e.g., between server and client). Of course, those of ordinary skill in the art will recognize that the techniques presented herein for proactively pushing content can be adapted for use in other deployment scenarios and/or applications, such as web applications, online gaming, peer-to-peer communications, etc. Further, note that while embodiments of the disclosure use image sharing applications and recommendation service applications as reference examples of applications that may be executed on mobile device, the approaches for proactively pushing content to mobile devices, via the cloud, can be adapted for use by a broad variety of other software applications, online or web services, etc.

Figure 1:
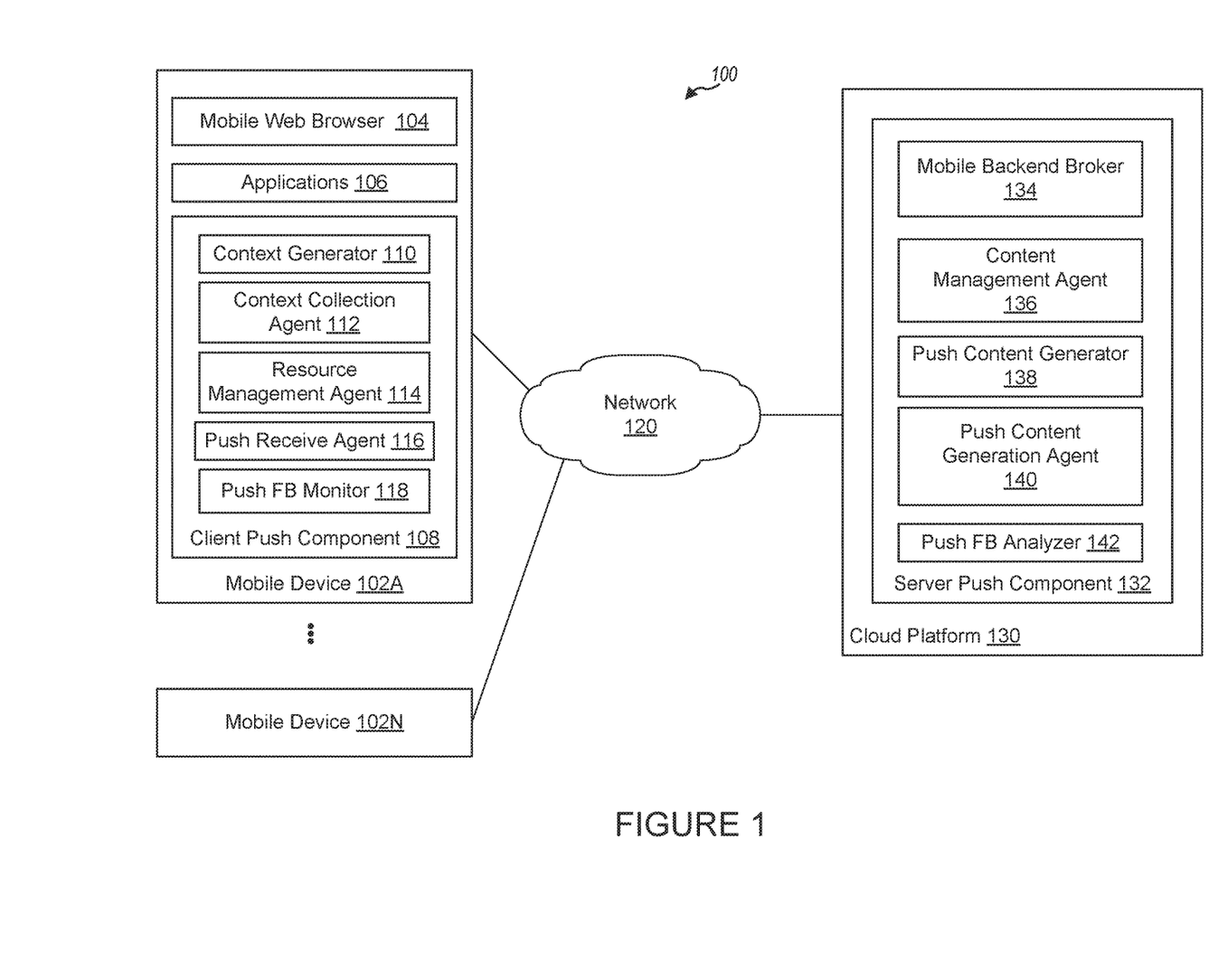
FIG. 1 illustrates an example computing environment configured to proactively push content to computing devices, according to one embodiment.

FIG. 1 illustrates an example of a computing environment 100 used to proactively send content to computing devices, according to one embodiment. As shown, the computing environment 100 includes mobile devices 102A-102N connected to a cloud platform 130 via a network 120. The network 120, in general, may be a wide area network (WAN), local area network (LAN), wireless LAN (WLAN), personal area network (PAN), a cellular network, etc. In a particular embodiment, the network 120 is the Internet.

Mobile devices 102A-N are included to be representative of any type of mobile computing device, such as a smartphone, tablet computer, portable gaming device, and the like. Users may use mobile devices 102A-N to access services and/or content provided via the cloud computing platform 130. For example, each mobile device 102A-N includes a mobile web browser 104, mobile applications 106 and client push component 108. The mobile device 102A can access the cloud computing platform 130 over the network 120 using the mobile web browser 104 or mobile applications 106 executed on the mobile device 102A. Generally, the mobile applications 106 may be any type of application, examples of which include social media applications, image sharing applications, data storage applications, and the like. The mobile applications 106 may interact with cloud computing platform 130 to request content stored within cloud computing platform 130. For example, a user may store hundreds or thousands of images in (databases, not shown) cloud computing platform 130, all of which may not be stored or displayed on the mobile device 102 (e.g., due to resource constraints on the mobile device 102). In such situations, the user may use a mobile application 106 to view images stored in the cloud computing platform 130. The cloud computing platform 130, in general, may provide various services to applications 106, such as messaging services, file storage and sharing, social networking services, messaging services, usage analysis tools, etc.

In one embodiment, responsive to the user's request to perform an operation (e.g., such as viewing images stored in cloud computing platform 130), the application 106 may use the client push component 108 to facilitate communications with the cloud computing platform 130. The client push component 108 is generally distributed logic configured to facilitate requests on behalf of applications 106 that touch the back-end services provided by the cloud platform 130. As described below, the client push component 108 is also configured to monitor the usage of pushed content by the applications 106 and provide feedback to (server push component 132 in) the cloud computing platform 130.

As shown, the client push component 108 includes a context generator 110, context collection agent 112, resource management agent 114, push receive agent 116 and push feedback monitor 118. In one embodiment, the context generator 110 executes as a background daemon process on the mobile device 102 that continuously computes an updated context for the mobile device 102. Generally, the context generator 110 may consider any attribute of the mobile device 102 when determining the current context of the mobile device 102. For example, the context generator 110 may pull data from different sensors (e.g., accelerometer, camera, microphone, graphical positioning system (GPS), etc.) on the mobile device 102, information currently being outputted for display on a display of the mobile device 102, resource usage (e.g., processor, memory, storage, network use, etc.), applications 106 which are currently executing on the mobile device, etc. In one embodiment, the context generator 110 may compress the collected context information and send the compressed context information to the context collection agent 112.

In one embodiment, once prompted by the resource management agent 114, the context collection agent 112 provides the current context of the mobile device 102 to the resource management agent 114. For example, the resource management agent 114 may request a current context of the mobile device 102 whenever any of the applications 106 need to request resources from the cloud computing platform 130. The resource management agent 114 is generally an enhanced resource management module that is configured to determine the current resources required by applications 106 executing on the mobile device 102. For example, the resource management agent 114 can determine that content (e.g., such as image) is needed from the cloud computing platform 130 in order to show the content to a user via a display on the mobile device 102. As such, the resource management agent 114 can determine actual resource requirements, generate a request, and send the request and current context (received from the context collection agent 112) to the server push component 132 in the cloud computing platform 130.

Referring now to the cloud computing platform 130, in one embodiment, the server push component 132 is distributed logic configured to facilitate processing of requests received from applications 106 for content stored in the cloud computing platform 130. For example, as described in more detail below, once the server push component 132 receives a request for content stored in the cloud computing platform 130, the server push component 132 is configured to determine (or predict) what additional content may be requested by an application and push the additional content to the mobile device, in advance of a request for that additional content.

As shown, the server push component 132 includes a mobile backend broker (e.g., an MBaaS broker) 134, content management agent 136, push content generator 138, push content generation agent 140 and push feedback analyzer 142. In one embodiment, the MBaaS broker 134 is a client-facing server that communicates with mobile clients, such as the mobile device 102A-N, directly. The MBaaS broker 134 can receive a request (in addition to a context) from the mobile device to access back-end services and/or content from the cloud computing platform 130. Once a request is received, the MBaaS broker 134 may invoke the content management agent 136 and/or push content generation agent 140. The content management agent 136 is generally configured to interface with the push content generator 138. For example, the content management agent 136 may provide the received user context and the request to the push content generator 138, and receive a set of content items from the push content generator 138.

In one embodiment, the push content generator 138 is an enhanced data mining module that is configured to predict the content that will be requested by the mobile device 102 in the future (e.g., in subsequent requests, such as a request to view a second page of search results or images). As described below with respect to FIG. 2, the push content generator 138 is configured to evaluate the request and context received from the mobile device, feedback provided from the mobile device 102 (e.g., regarding previous content pushed to the mobile device 102), and/or information from other mobile devices 102 (e.g., with similar requests/contexts, historical user access patterns to content, etc.). In some embodiments, the push content generator 138 may use a set of rules (configured by the push feedback analyzer) to identify what additional content to push to the mobile device 102. Continuing with the restaurant search example, the current request may request to view a first type of restaurant. The push content generator 138 may identify a first list of restaurants in the cloud computing platform 130 that include the first type of restaurant and provide the requested content to the content management agent 136. Additionally, the push content generator 138 may analyze the request, the user context, access patterns of the user, access patterns of other users, etc., to identify a second list of restaurants that the mobile device 102 may subsequently request. For example, if the first list of restaurants correspond to restaurants near the user's location at a particular time of day (e.g., during lunch), the push content generator 138 may identify the user's location in the context, and identify other types of restaurants near the user's location that are also open during lunch. Similarly, if requests from other users indicate that other users in this user's location have previously requested the first type of restaurants, the other user requests and patterns may indicate which other restaurants this user may also be interested in. The push content generator 138 may leverage this other information when predicting which restaurants the user will request subsequent to the current request.

In one embodiment, once the push content generator 138 identifies content responsive to a request and additional content that the user may request in the future, the push content generator 138 transmits an indication of the identified content to the content management agent 136. The content management agent 136, in turn, may invoke the push content generation agent 140, which sends the identified content to the mobile device 102. In one embodiment, the push content generation agent 140 sends the identified content to the mobile device 102 according to the HTTP/2 protocol. As described, such protocol allows servers to re-use a TCP connection in order to proactively send content to a client (e.g., without first receiving a request for the content). In some examples, the HTTP/2 protocol may also allow for multiplexing, compression and prioritization of the content that is pushed to clients.

Referring back to mobile device 102, the push receive agent 116 is configured to receive push content and forward the push content to the applications 106. The push receive agent 116 is also configured to interact with applications 106 to deliver additional content received from the push content generation agent 140. Continuing with the above example, the push receive agent 116 may deliver the requested first list of restaurants to the applications 106. Further, if the push receive agent 116 determines that the applications 106 are being used to request the second list of restaurants, the push receive agent 116 can proactively deliver the second list of restaurants to the applications 106 in advance of the applications 106 requesting the second list of restaurants. In other cases, as described below, instead of holding the additional content received from the push content generation agent 140, the push receive agent 116 can proactively show the applications 106 the additional content. Once the applications 106 receive an indication of the additional content, the applications 106 can decide whether to accept or reject the additional content.

In one embodiment, the push feedback monitor 118 is configured to monitor the applications 106 use of the pushed content (e.g., requested content and additional content) received by the push receive agent 116 and provide feedback on such use to the push feedback analyzer 142 in the server push component 132. For example, the push feedback monitor 118 is an enhanced mobile background daemon process that continuously monitors the access patterns and frequency of pushed content by the applications 106 on the mobile device 102. The push feedback monitor 118 may generate compressed metadata for the push feedback analyzer 142. Examples of the compressed metadata may include the times the content (received by the push receive agent 116) was accessed, whether the content accessed was requested content or additional content, which applications 106 accessed the content, how long the content was displayed on the mobile device 102, whether the content was cached (or saved) on the mobile device, the order in which the content was viewed, etc.

The push feedback analyzer 142 is configured to receive feedback regarding content pushed to the mobile device 102 from the push feedback monitor 118. The push feedback analyzer 142 is an enhanced machine learning module that learns and analyzes the metadata describing the actual use of the push content on the mobile device 102. As described below, based on the metadata, the push feedback analyzer 142 may dynamically configure and/or update rules for content generation. For example, the push content generator 138 may use the rules when selecting content to send to the mobile device 102.

Note FIG. 1 illustrates merely one reference example of a computing environment 100 in which proactive content may be delivered to mobile devices. Those of ordinary skill in the art will recognize that other configurations of the computing environment 100 may be adapted to deliver proactive content to mobile devices.

Figure 2:
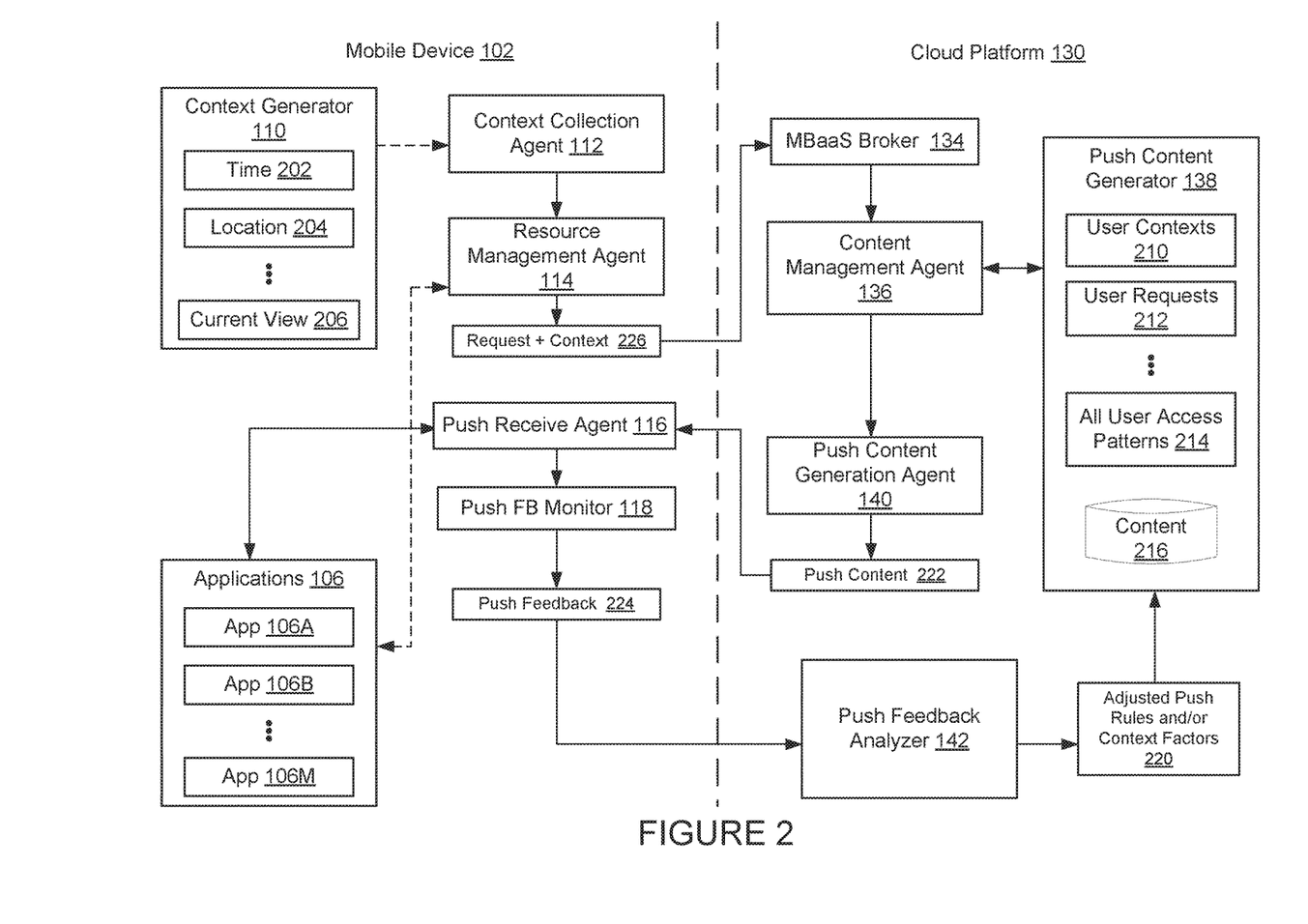
FIG. 2 further illustrates components of a computing environment configured to proactively push content to computing devices, according to one embodiment.

FIG. 2 further illustrates components of the mobile device 102 and cloud computing platform 130, described relative to FIG. 1, according to one embodiment. As noted above, although FIG. 2 illustrates components of a mobile device interacting with components of a cloud, the techniques presented herein can be adapted for use in other deployments/applications, such as web applications, online gaming, etc. As shown, in the mobile device 102, the context collection agent 112 interacts with the context generator 110 to continuously generate contexts for the mobile device 102. As noted, the context generator 110 may consider any attribute of the mobile device. As shown in this embodiment, the context generator 110 considers a current time 202, a location 204 of the mobile device 102, and a current view 206 (e.g., what is displayed on the screen of the mobile device) when determining the current context of the mobile device 102. Once collected, the context generator 110 may compress the information and send the context information to the context collection agent 112.

In one embodiment, the resource management agent 114 may prompt the context collection agent 112 to provide the current context of the mobile device 102 whenever the resource management agent 114 determines a user is using one of applications 106 to request a resource or content stored in the cloud computing platform 130. Referring to one reference example above, the user may use an application 106 to browse and share images stored in a database (e.g., content database 216) in the cloud computing platform 130. In another reference example, the user may use an application 106 to search for nearby restaurants (e.g., seafood restaurants). The resource management agent 114 is configured to determine the actual resource requirements of the applications 106 and, therefore, can detect when the applications 106 need to request a particular resource or content. Once detected, the resource management agent 114 can request a current context of the mobile device 102 from the context collection agent 112 to send along with a request for the content (e.g., a particular image, list of restaurants, etc.).

As shown, the resource management agent 114 prepares a request and context 226 and sends the request and context 226 to the MBaaS broker 134. Once the request and context 226 is received, the MBaaS broker 134 may invoke the content management agent 136 and provide the request and context 226 to the content management agent 136. The content management agent 136 is configured to interact with the push content generator 138 to receive push content that is responsive to the request 226 and additional push content that may be requested in the future by one of applications 106.

As shown, the push content generator 138 includes user contexts 210, user requests 212, user access patterns 214 and content 216. The content 216 generally represents content stored in the cloud computing platform 130 and may be any type of content, such as images, videos, files, objects, metadata, etc. The user contexts 210 include contexts of all mobile devices 102 that may submit requests for content/services to cloud computing platform 130. The user requests 212 include information associated with each request received from all mobile devices 102. The user access patterns 214 store historical user access patterns to the content 216. For example, such access patterns may include the historical access patterns of the mobile device currently submitting requests as well as the historical access patterns of other mobile devices. The access patterns may indicate whether particular types of content are more frequently accessed than other types of content, whether the applications use content in a particular order, and the like. For example, using the above example of an application that is used to browse images stored in the content 216, the access patterns 214 may indicate which images the user has previously requested, the order in which the images are requested, whether the images occurred on a particular date, whether the images are from a particular location, and other attributes associated with the images requested. Referring to another example of a restaurant application, the access patterns 214 in this example may indicate the types of restaurants that other users have previously requested from content 216, request patterns of other users in the same or nearby location as the current user, feedback from other users regarding previously received pushed content, etc.

The push content generator 138 is configured to use the user contexts 210, user requests 212 and/or user access patterns 214 to determine, for a given request from a mobile device 102, the content that the mobile device 102 may subsequently request. Referring to the image browsing example, the current request from a mobile device 102 may request to view a first image in the content 216. The push content generator 138 may identify the first image in the content 216 and send the first image to the content management agent 136. Additionally, the push content generator 138 can identify one or more second images to push along with the first image. For example, the push content generator 138 may analyze the request and determine that the first image was taken on a particular date or is associated with a particular collection of other images. Based on such information, the push content generator 138 may identify one or more second images that were also taken on the same date or associated with the collection as the first image. In some cases, the push content generator 138 may also consider other attributes (e.g., sensor values, resource constraints, operating condition, etc.) of the mobile device 102 that are contained in the context for the mobile device 102. For example, still using the image browsing example, the push content generator 138 may determine the amount of memory and/or storage currently available on the memory device 102, and determine a quality (e.g., high resolution, low resolution) and/or number of second images to push to the mobile device 102 based on the amount of memory and/or storage available. In another example, the push content generator 138 may determine how many second images to push to mobile device based on a quality of the network connection between the mobile device 102 and the cloud computing platform 130.

Once the push content generator 138 identifies content responsive to a request and additional content that may be subsequently requested, the push content generator 138 may notify the content management agent 136 that the content has been identified. The content management agent 136, in turn, may invoke the push content generation agent 140, which sends the push content 222 to the mobile device 102. As noted, the push content generation agent 140 can send the additional content within content 222 using the same TCP connection that was used by the mobile device to submit the request.

As shown, the push receive agent 116 receives the push content 222 from the push content generation agent 140. The push receive agent 116 is configured to interact with the applications 106 to deliver requested content and/or additional content. Referring to the image browsing example, if the push content 222 includes a requested first image and one or more (not requested) second images, the push receive agent 116 sends the first image to the application 106 that requested the first image. The push receive agent 116 may then determine if there is a reaction to any of the additional pushed second images. Put differently, the push receive agent 116 can monitor the applications 106, and determine if any of the applications 106 are being used to submit requests for the second images. If so, the push receive agent 116 can send the second images to the application 106, in advance of the application 106 submitting a request for the second images. In some embodiments, however, instead of holding the additional pushed content, the push receive agent 116 can proactively show the applications 106 the additional pushed content. Referring to the above example, once the client push component 108 receives a recommended set of additional images, the client push component 108 can provide an indication of the recommended additional images to the applications 106. The applications 106, in turn, may decide whether to accept or reject a portion or all of the recommended set of additional images.

The push receive agent is also configured to interact with the push feedback monitor 118 to provide feedback to the push feedback analyzer 142 regarding the applications 106 use of the push content 222. For example, continuing with the example above, the push feedback monitor 118 can monitor which applications 106 access the pushed images, the order in which the images are accessed, the frequency in which the images are accessed, and other access patterns. Once collected, the push feedback monitor 118 generates push feedback 224 describing the patterns and access frequencies and sends the push feedback 224 to the push feedback analyzer 142.

As noted above, once received, the push feedback analyzer 142 is configured to dynamically adapt (or update) rules that are used by the push content generator 138 to generate push content. Using the image browsing example, one such rule may dictate the order of the attributes the push content generator 138 should consider when selecting additional images to push to the mobile device 102. For example, the rule may specify that the images with a date that corresponds to the first image should be selected first, specify that images with a location that corresponds to the first image should be selected second, and so on. In general, however, the rules that are used by the push content generator 138 may be based on any criteria associated with the mobile device 102, other mobile devices, and/or content 216 in the cloud computing platform 130. For example, the rules may also be based on one or more context factors of the mobile device 102. If the mobile device 102 has limited storage capacity, for example, the rules may dictate that a lower number and/or lower quality of images be returned. Conversely, if the mobile device has large storage capacity, the rules may not place a high priority on the quality and/or number of the images that are returned.

The push feedback analyzer 142 may adapt the rules that are used to identify additional content based on the feedback 224. For example, if the feedback 224 indicates that, out of the second images pushed to the mobile device 102, only images with a corresponding location to the first image were selected, the push feedback analyzer 142 may adapt the above rule such that the location attribute associated with images in the content 216 is considered before other criteria or attributes. Those of ordinary skill in the art, however, will recognize that other adaptations are also possible. Once the push feedback analyzer 142 receives the feedback 224 and adjusts (if any) rules used for the content generation, the push feedback analyzer 142 sends the adjusted rules and/or context factors 220 to the push content generator 138, which uses the adjusted rules to select content 216 to send to the mobile device 102. In this manner, the techniques presented herein can significantly improve user experience with services and/or content delivered via the cloud. For example, the mobile client can experience a faster response time for resources requested from the MBaaS server. Similarly, the MBaaS server can significantly improve the transmission time for pushed content.

Figure 3:
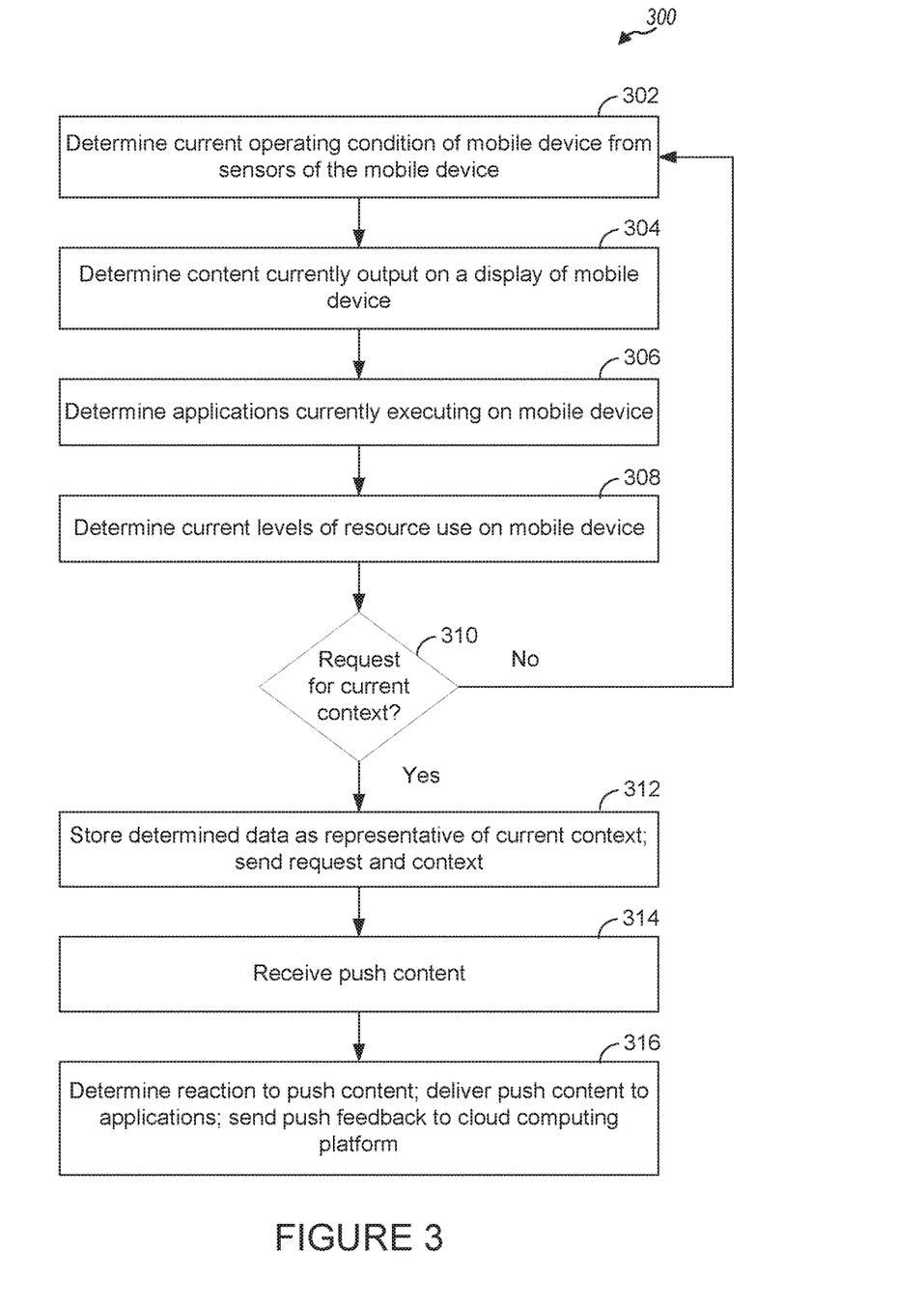
FIG. 3 is a flow chart illustrating a method for determining a context of a mobile device and feedback regarding push content, according to one embodiment.

FIG. 3 illustrates a method 300 for determining a context of a mobile device and feedback regarding push content, according to one embodiment. As shown, the method 300 begins at block 302 where the client push component 108 determines a current operating condition of the mobile device 102 (e.g., based on sensors of the mobile device). For example, as noted, the client push component 108 may pull data from different sensors (e.g., accelerometer, camera, microphone, etc.) to determine a current operating condition of the mobile device. At block 304, the client push component 108 determines what content is currently output on a display of the mobile device (e.g., what image is currently being displayed, what page of search results is being displayed, etc.). At block 306, the client push component 108 determines applications currently executing on the mobile device. At block 308, the client push component 108 determines current levels or amounts of resource use (e.g., processor, memory, storage, network, etc.) on the mobile device.

As noted, the client push component 108 may continually collect context information for the mobile device. For example, if the client push component 108 does not receive a request for a current context (e.g., applications on the mobile device may not be requesting resources and/or content from the cloud), the client push component 108 continues to collect context information for the mobile device (blocks 302-308). On the other hand, at block 310, if the client push component 108 receives a request for a current context (e.g., an application may require resources/content), the client push component 108 proceeds to block 312 where the client push component 108 stores the determined data as representative of a current context of the mobile device. The client push component 108 also sends a request (from one of the applications executing on the mobile device) and the context to the MBaaS server in the cloud.

At block 314, the client push component 108 receives push content from the back-end services in the cloud. Such content can include the requested content and/or additional content that was not requested. At block 316, the client push component 108 determines whether there is a reaction to the pushed content, and if so, how the applications react to the pushed content. For example, as noted above, the client push component 108 can determine whether any of the applications start to request the additional pushed content, and if so, deliver the additional pushed content to the applications. In other cases, the client push component 108 may proactively show the additional pushed content to the applications (e.g., instead of holding the additional pushed content). The client push component 108 can also monitor the manner (e.g., frequency, type of access) in which the applications access the additional pushed content and provide feedback on the frequency and pattern of access to the content to the back-end services in the cloud. In this manner, one or more mobile devices communicating with back-end services via a cloud can actively provide feedback regarding pushed content in order to improve delivery of content and/or services via the cloud.

Figure 4:
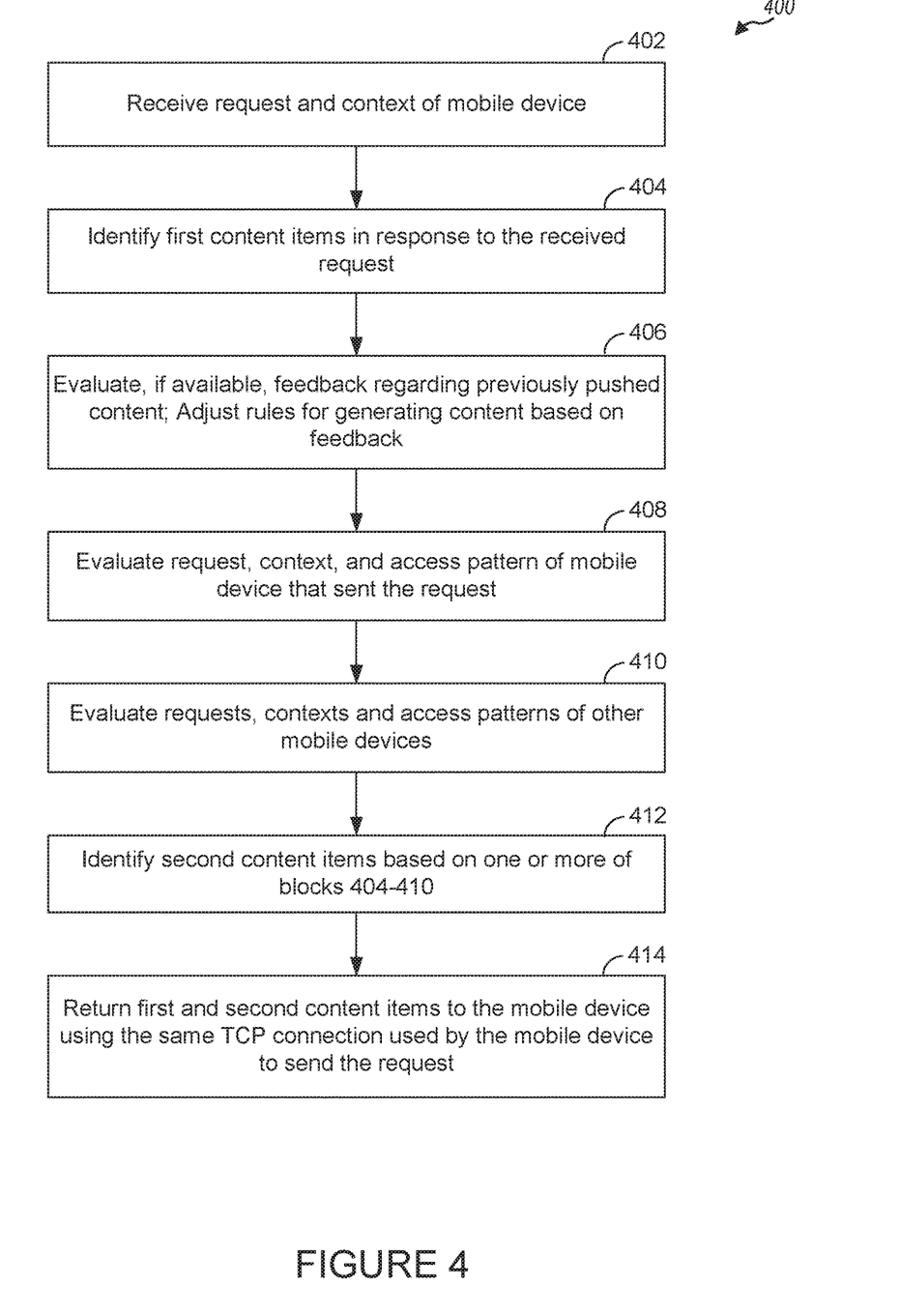
FIG. 4 is a flow chart illustrating a method for proactively identifying and delivering push content to mobile devices via the cloud, according to one embodiment.

FIG. 4 illustrates a method 400 for proactively identifying and delivering content to mobile devices via the cloud, according to one embodiment. In other embodiments, the method 400 may be used to send content to devices in other contexts, such as web applications, online gaming, etc. As shown, the method 400 begins at block 402 where the server push component 132 receives a request and context of a mobile device. For example, as noted, the request may be a request for particular content (e.g., one or more images stored in the cloud) or services provided by back-end components in the cloud. At block 404, the server push component 132 identifies, from one or more content items, at least a first content item that is responsive to the received request. For example, if the request is for an image stored in the cloud, the server push component 132 identifies the image in the cloud. In another example, if the request is for restaurants near the user's location, the server push component 132 can identify a list of such restaurants.

At block 406, the server push component 132 evaluates, if available, feedback regarding previously pushed content to the mobile device. Using the image browsing example, the server push component 132 may have received a previous request for an image, identified the requested image along with one or more additional images, and returned the requested image and additional images to the mobile device. The mobile device may have provided feedback regarding the accuracy of the additional images (e.g., whether the images were used or not used, the order in which the images were accessed, or other criteria). Based on the feedback, the server push component 132, at block 406, can, for any given request, adjust rules for generating additional content that that may be subsequently requested. For example, if in the previous response, only some of the additional images were accessed, the server push component 132 can determine the common attributes between the images that were accessed and the requested image, and adjust the rules such that the common attributes are given higher priority when selecting additional images in the future.

At block 408, the server push component 132 evaluates the request, context, and access pattern of the mobile device that sent the request. Based in part on the evaluation, the server push component 132 can determine similar additional content that the user may subsequently request along with how much of the additional content can be sent to the mobile device (e.g., based on the resource usage information of the mobile device within the context). At block 410, the server push component 132 may also evaluate the requests, contexts, and access patterns of other mobile devices. Such evaluation can provide the server push component 132 with additional information regarding how other mobile devices that have sent similar requests have used additional content pushed to them. Using the restaurant search example, the server push component 132 can identify restaurants other users (in the same or nearby location as the current user) have requested, and use the information when selecting additional restaurants to provide to the user (e.g., for subsequent page results of restaurants).

At block 412, the server push component 132 identifies at least a second content item from the one or more content items based on one or more of the identified first content items (e.g., block 404), request, context and access pattern of the mobile device that sent the request, feedback regarding previously pushed content, requests, contexts and access patterns of other mobile devices, etc. (e.g., blocks 404-410). In some cases, however, the server push component 132 may evaluate the information received in blocks 404-410 and determine not to generate any additional content items. Referring again to the image browsing example, in some cases, the server push component 132 may determine based on the image requested in the initial request, the user's previous access pattern, etc., that the user has not previously requested additional images after requesting the first image. In such a case, the server push component 132 may not generate any additional content to send to the mobile device. In another example, the server push component 132 may determine based on the context of the mobile device that the mobile device has limited storage capacity. Thus, in such a case, the server push component 132 may determine that the mobile device may not be able to receive an additional image, and may not generate additional images to send to the mobile device.

At block 414, the server push component 132 generates a response that includes at least the identified first content items and at least the identified second content items, and sends the response to the mobile device using the same TCP connection used by the mobile device to send the request (e.g., using the HTTP/2 protocol). In this manner, the techniques presented herein allow back-end providers (e.g., MBaaS providers) to proactively send content to mobile devices in order to enhance a user's experience with services and/or content delivered via the cloud.

Figure 5:
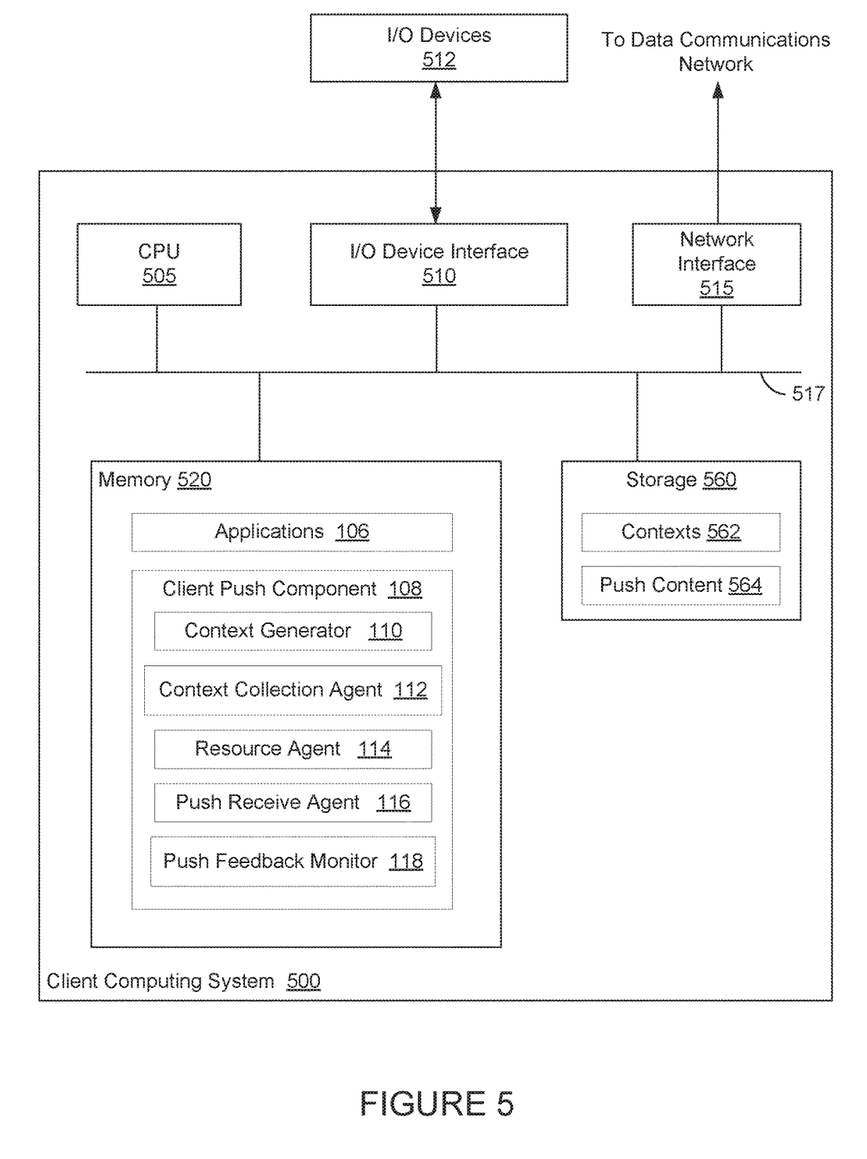
FIG. 5 is a block diagram of a computing system configured to monitor push content and push feedback regarding the push content, according to one embodiment.

FIG. 5 illustrates an example client computing system 500 configured to determine context information and feedback regarding content pushed to the computing system 500, according to one embodiment. As shown, the computing system 500 includes, without limitation, a central processing unit (CPU) 505, a network interface 515, a memory 520, and storage 560, each connected to a bus 517. The computing system 500 may also include an I/O device interface 510 connecting I/O devices 512 (e.g., keyboard, display and mouse devices) to the computing system 500. The computing system 500 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 505 retrieves and executes programming instructions stored in the memory 520 as well as stored in the storage 560. The bus 517 is used to transmit programming instructions and application data between the CPU 505, I/O device interface 510, storage 560, network interface 515, and memory 520. Note, CPU 505 is included to be representative of a single CPU, multiple CPUs, a single CPU having multiple processing cores, and the like, and the memory 520 is generally included to be representative of a random access memory. The storage 560 may be a disk drive or flash storage device. Although shown as a single unit, the storage 560 may be a combination of fixed and/or removable storage devices, such as fixed disc drives, removable memory cards, optical storage, network attached storage (NAS), or a storage area-network (SAN).

Illustratively, the memory 520 includes applications 106 and a client push component 108, which includes context generator 110, context collection agent 112, resource management agent 114, push receive agent 116 and push feedback monitor 118, all of which are described in greater detail above. Further, storage 560 includes contexts 562 and push content 564. Contexts 562 may be generated and collected by the context generator 110 and context collection agent 112, and may include information representative of the current operating conditions, resource utilization, currently executing applications, etc. on the client computing system 500. Push content 564 may include content requested by the client computing system 500 from the cloud and/or additional content not requested by the client computing system 500 from the cloud. Such additional content, however, may be content that the client computing system 500 will likely request in the future.

Figure 6:
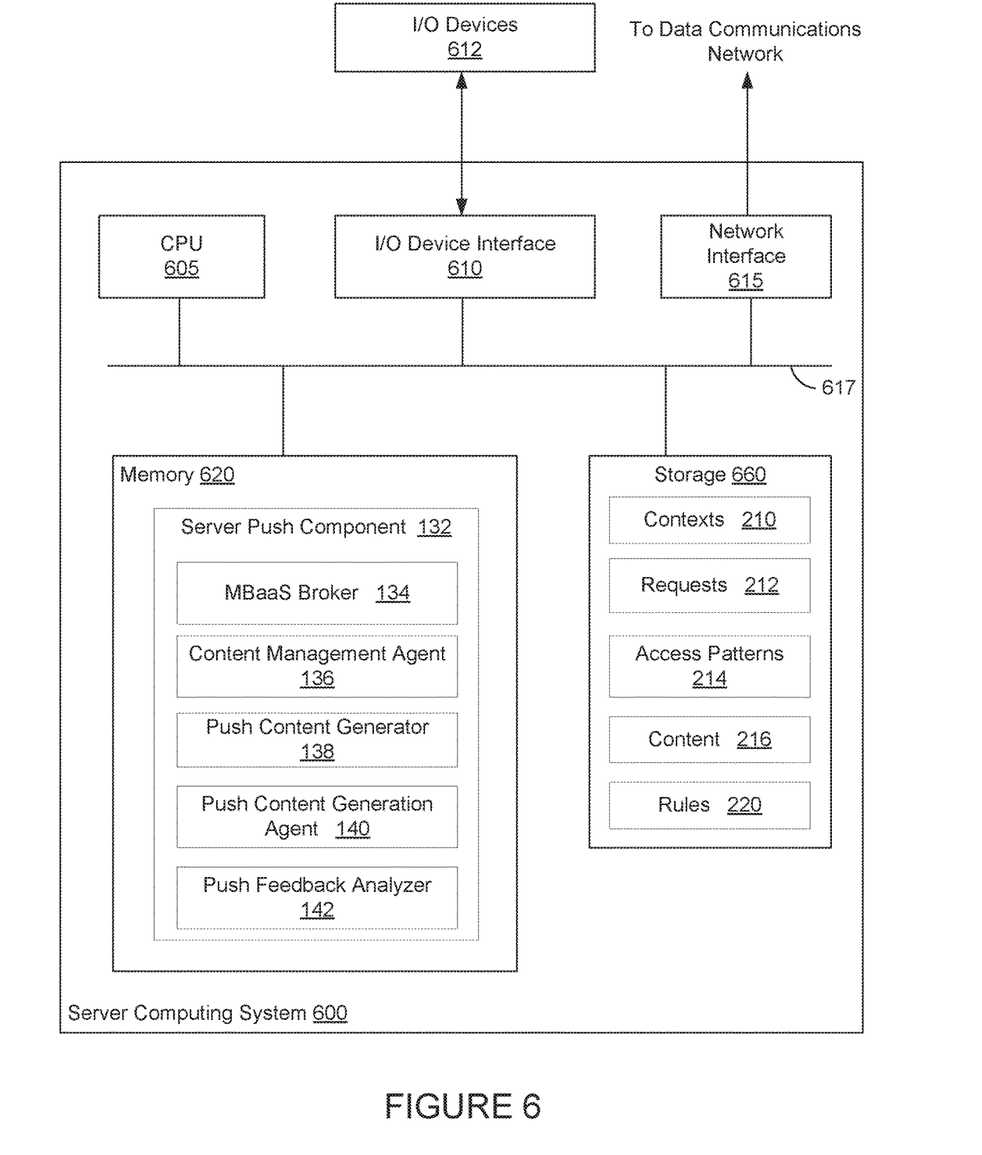
FIG. 6 is a block diagram of a computing system configured to proactively push content to mobile devices, according to one embodiment.

FIG. 6 illustrates an example server computing system 600 configured to proactively push content to mobile devices, according to one embodiment. As shown, the computing system 600 includes, without limitation, a central processing unit (CPU) 605, a network interface 615, a memory 620, and storage 660, each connected to a bus 617. The computing system 600 may also include an I/O device interface 610 connecting I/O devices 612 (e.g., keyboard, display and mouse devices) to the computing system 600. The computing system 600 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 605 retrieves and executes programming instructions stored in the memory 620 as well as stored in the storage 660. The bus 617 is used to transmit programming instructions and application data between the CPU 605, I/O device interface 610, storage 660, network interface 615, and memory 620. Note, CPU 605 is included to be representative of a single CPU, multiple CPUs, a single CPU having multiple processing cores, and the like, and the memory 620 is generally included to be representative of a random access memory. The storage 660 may be a disk drive or flash storage device. Although shown as a single unit, the storage 660 may be a combination of fixed and/or removable storage devices, such as fixed disc drives, removable memory cards, optical storage, network attached storage (NAS), or a storage area-network (SAN).

Illustratively, the memory 620 includes server push component 132, which includes MBaaS broker 134, content management agent 136, push content generator 138, push content generation agent 140 and push feedback analyzer 142, all of which are discussed in greater detail above. Further, storage 660 includes contexts 210, requests 212, access patterns 214, content 216 and rules 220, all of which are also discussed in greater detail above.

Advantageously, embodiments disclosed herein provide techniques to proactively push content to mobile devices (e.g., in advance of user's using the mobile devices to request the content). As described above, the MBaaS platform may determine what additional content the user may subsequently request based on context of the mobile device, information received from other mobile devices, feedback regarding previously pushed content to the mobile device, etc. Doing so allows may improve the response time experienced by a user using the mobile device to access services and/or content provided via the cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the server push component 132 could execute on a computing system in the cloud and proactively deliver content based, in part, on a context of a mobile device requesting the content. Doing so allows a user to access requested and additional information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for sending content to a mobile device by a computing device, comprising:
   receiving feedback regarding first content items pushed to the mobile device, the feedback indicating an order and frequency in which the first content items pushed to the mobile device were accessed;
   after receiving the feedback, receiving, via a communication protocol used over a connection established between the computing device and the mobile device, a request from the mobile device to access a second content item and a context of the mobile device with the request to access the second content item, wherein the context of the mobile device comprises an indication of: an amount of resources being used by the mobile device;
   identifying the second content item responsive to the request;
   determining at least one third content item based on the second content item, the context of the mobile device, and the feedback, comprising:
      determining a first set of attributes associated with a subset of the first content items, based on an evaluation of the order and frequency in which the first content items pushed to the mobile device were accessed;
      configuring one or more rules for evaluating the second content item, based on the order and frequency in which the first content items pushed to the mobile device were accessed;
      determining, according to the one or more rules, which second attributes associated with the second content item correspond to the first set of attributes associated with the subset of the first content items, wherein the one or more rules specify an order for evaluating the second attributes associated with the second content item; and
      selecting at least one content item having the determined second attributes as the at least one third content item, wherein a number of the at least one content item selected as the at least one third content item is based at least in part on the amount of resources being used by the mobile device;
   generating a response to the request that includes at least the second content item and the at least one third content item; and
   pushing the response to the mobile device using the communication protocol over the connection established between the computing device and the mobile device.

2. The computer-implemented method of claim 1, further comprising updating the one or more rules based on feedback received from the mobile device indicating an order and frequency in which the at least one third content item pushed to the mobile device were accessed.

3. The computer-implemented method of claim 1, wherein the determination of the at least one third content item comprises selecting, according to the specified order, the at least one content item having the determined second attributes as the at least one third content item.

4. The computer-implemented method of claim 1, wherein the feedback further indicates use of at least one of the first content items pushed to the mobile device.

5. The computer-implemented method of claim 1, wherein the communication protocol is HyperText Transfer Protocol (HTTP) version 2 (HTTP/2).

6. A computer program product, comprising:
   a non-transitory computer-readable storage medium having computer-readable program code embodied therewith, the computer-readable program code executable by one or more computer processors to perform an operation by a computing device for sending content to a mobile device, comprising:
      receiving feedback regarding first content items pushed to the mobile device, the feedback indicating an order and frequency in which the first content items pushed to the mobile device were accessed;
      after receiving the feedback, receiving, via a communication protocol used over a connection established between the computing device and the mobile device, a request from the mobile device to access a second content item and a context of the mobile device with the request to access the second content item, wherein the context of the mobile device comprises an indication of an amount of resources being used by the mobile device;
      identifying the second content item responsive to the request;
      determining at least one third content item based on the second content item, the context of the mobile device, and the feedback, comprising:
         determining a first set of attributes associated with a subset of the first content items, based on an evaluation of the order and frequency in which the first content items pushed to the mobile device were accessed;

configuring one or more rules for evaluating the second content item, based on the order and frequency in which the first content items pushed to the mobile device were accessed;

determining, according to the one or more rules, which second attributes associated with the second content item correspond to the first set of attributes associated with the subset of the first content items, wherein the one or more rules specify an order for evaluating the second attributes associated with the second content item; and selecting at least one content item having the determined second attributes as the at least one third content item, wherein a number of the at least one content item selected as the at least one third content item is based at least in part on the amount of resources being used by the mobile device;

generating a response to the request that includes at least the second content item and the at least one third content item; and pushing the response to the mobile device using the communication protocol over the connection established between the computing device and the mobile device.

7. The computer program product of claim 6, the operation further comprising updating the one or more rules based on feedback received from the mobile device indicating an order and frequency in which the at least one third content item pushed to the mobile device were accessed.

8. The computer program product of claim 6, wherein the determination of the at least one third content item comprises selecting, according to the specified order, the at least one content item having the determined second attributes as the at least one third content item.

9. The computer program product of claim 6, wherein the feedback further indicates use of at least one of the first content items pushed to the mobile device.

10. A mobile backend as a service (MBaaS) server, comprising:
a computer processor; and
a memory containing a program, which when executed by the computer processor, performs an operation for sending content to a mobile device, comprising:
receiving feedback regarding first content items pushed to the mobile device, the feedback indicating an order and frequency in which the first content items pushed to the mobile device were accessed;
after receiving the feedback, receiving, via a communication protocol used over a connection established between the MBaaS server and the mobile device, a request from the mobile device to access a second content item and a context of the mobile device with the request to access the second content item, wherein the context of the mobile device comprises an indication of an amount of resources being used by the mobile device;

identifying the second content item responsive to the request;

determining at least one third content item based on the second content item, the context of the mobile device, and the feedback, comprising:
determining a first set of attributes associated with a subset of the first content items, based on an evaluation of the order and frequency in which the first content items pushed to the mobile device were accessed;

configuring one or more rules for evaluating the second content item, based on the order and frequency in which the first content items pushed to the mobile device were accessed;

determining, according to the one or more rules, which second attributes associated with the second content item correspond to the first set of attributes associated with the subset of the first content items, wherein the one or more rules specify an order for evaluating the second attributes associated with the second content item; and selecting at least one content item having the determined second attributes as the at least one third content item, wherein a number of the at least one content item selected as the at least one third content item is based at least in part on the amount of resources being used by the mobile device;

generating a response to the request that includes at least the second content item and the at least one third content item; and pushing the response to the mobile device using the communication protocol over the connection established between the MBaaS server and the mobile device.

11. The MBaaS server of claim 10, the operation further comprising updating the one or more rules based on feedback received from the mobile device indicating an order and frequency in which the at least one third content item pushed to the mobile device were accessed.

12. The MBaaS server of claim 10, wherein the determination of the at least one third content item comprises selecting, according to the specified order, the at least one content item having the determined second attributes as the at least one third content item.

13. The MBaaS server of claim 10, wherein the feedback further indicates use of at least one of the first content items pushed to the mobile device.

* * * * *